United States Patent Office 3,741,948
Patented June 26, 1973

3,741,948
PROCESS FOR THE PREPARATION OF N-PROTECTED - α - L-GLUTAMYL - S - BENZYL-L-CYSTEINYLGLYSINES
Masuo Murakami, Yuji Kawashima, Hideyo Kawakami, and Osamu Hasegawa, Tokyo, Japan, assignors to Yamanouchi Pharmaceutical Co., Ltd., Tokyo, Japan
No Drawing. Filed May 28, 1970, Ser. No. 41,636
Claims priority, application Japan, June 19, 1969, 44/47,920
Int. Cl. C07c 103/52
U.S. Cl. 260—112.5    4 Claims

ABSTRACT OF THE DISCLOSURE

An improved process is provided for the preparation of N-protected-α-L-glutamyl-S-benzyl-L-cysteinylglycines of the formula $R^1$—NH—CHCH$_2$CH$_2$CONHCHCONHCH$_2$COOH
　　　　|　　　　　　　　　|
　　　COOH　　　　　CH$_2$—S—CH$_2$— 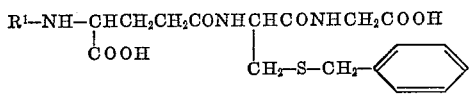

in which $R^1$ represents a protecting group for the amino group. These compounds are valuable as intermediates for the production of glutathione, involving hydrolysis of a compound of the formula $R^1$—N———CHCH$_2$CH$_2$CONHCHCONHCH$_2$COOR$^2$
　　|　　|　　　　　　　　　|
　CH$_2$　C=O　　　　　CH$_2$—S—CH$_2$— 
　　\\O/ in which $R^1$ has the same meaning as above and $R^2$ represents a hydrogen atom or a lower alkyl group. The hydrolysis is effected in the absence of an organic solvent miscible with water to prevent formation of undesirable compounds.

---

The present invention relates to an improved process for the preparation of N-protected-γ-L-glutamyl-S-benzyl-L-cysteinylglycines of the Formula I $R^1$—NH—CHCH$_2$CH$_2$CONHCHCONHCH$_2$COOH
　　　　|　　　　　　　　　|
　　　COOH　　　　　CH$_2$—S—CH$_2$— 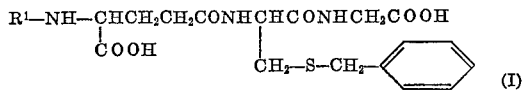
　　　　　　　　　　　　　　　　　　　(I)

in which $R^1$ represents a protecting group for the amino group, by hydrolysis with an alkali of a (3-substituted-5-oxo-4-oxazolidinyl)propionyl - S - benzyl - L - cysteinylglycine derivative of the Formula II $R^1$—N———CHCH$_2$CH$_2$CONHCHCONHCH$_2$COOR$^2$
　　|　　|　　　　　　　　　|
　CH$_2$　C=O　　　　　CH$_2$—S—CH$_2$— 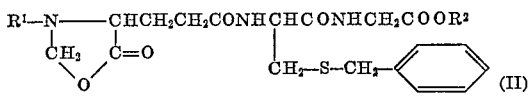
　　\\O/
　　　　　　　　　　　　　　　　　　　(II)

in which $R^1$ has the same meaning as above and $R^2$ represents a hydrogen atom or a lower alkyl group, wherein the hydrolysis is effected in the absence of any organic solvent miscible with water.

The object of the present invention resides in providing a process for the preparation of compounds of the Formula I wherein formation of the α-isomers thereof i.e. the compounds of the formula $R^1$—NH—CH———CONHCHCONHCH$_2$COOH
　　　　|　　　　　　　|
　　CH$_2$CH$_2$COOH　CH$_2$—S—CH$_2$— 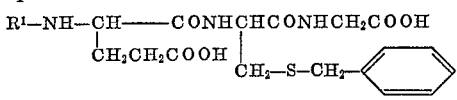

can be prevented.

The products of the present invention, or the compounds of the Formula I, are valuable as intermediates for the production by synthesis of glutathione i.e. γ-L-glutamyl-S-benzyl-L-cysteinylglycine (hereinafter will be abbreviated as GSH).

As is well known, GSH is composed of L-glutamic acid, L-cysteine and glycine, and the amide bond between the L-glutamic acid and the L-cysteine is formed with the γ-carboxyl group of the former and the amino group of the latter. Therefore, it is necessary on synthesizing GSH from said three amino acids to select and use those reaction conditions which are suitable for ensuring the formation of such amide bond.

For the preparation of compounds of the Formula I, there is a known process wherein 3-p-toluenesulfonyl-5-oxo-4-oxazolidinyl propionic acid obtainable by reacting N-p-toluenesulfonyl glutamic acid with formaldehyde is made to react with methyl S-benzyl-L-cysteinylglycinate to form methyl (3-p-toluenesulfonyl-5 - oxo - 4 - oxazolidinyl) propionyl-S-benzyl - L - cysteinylglycinate (which corresponds to the above Formula II) and the latter is hydrolysed with an alkali in a mixture of dioxane and water to give N - p - toluenesulfonyl - γ - L - glutamyl - S-benzyl-L-cysteinylglycine [P. Baudet and I. Borecka, Ann. Chim. (Rome), 53, 53–60 (1963): C.A., 59, 2944f–2945e (1963)].

However, it has been found after examination in our laboratory that, according to this known process, the α-isomer in which the α-carboxyl group of L-glutamic acid is bound to the amino group of L-cysteine is formed as a by-product in the hydrolysis step. Although the amount of the α-isomer so formed varies depending on the reaction conditions employed, it usually amounts to 6–8% of the product. Nevertheless, it is undesirable to utilize such a product as it is, as the starting material in the subsequent final step to obtain GSH, since the separation of the α-isomer from the γ-compound is very difficult. Thus, the yield of GSH is largely influenced by the α-isomer contained in the starting material.

Now, it has been found after laborious investigations to overcome the shortcomings of the known processes referred to above that only the desired γ-compounds of the Formula I can be obtained when the hydrolysis with an alkali of a compound of the Formula II is effected in the absence of any organic solvent miscible with water, such as dioxane the solvent usually employed in the known processes. Moreover, this hydrolysis reaction is not influenced by the type of the protecting group for the amino group of the Compound II used as the starting material.

The process of this invention may be performed by suspending a compound of the Formula II in a dilute aqueous alkali solution which contains usually the equimolar amount (in relation to the Compound II) or excess, preferably 2–3 times molar amount of an alkali such as sodium hydroxide, potassium hydroxide, barium hydroxide, sodium carbonate or the like, and stirring the suspension for 1–2 hours at room temperature. The Compound I formed by the reaction, which is dissolved in the reaction mixture in the form of the alkali or alkaline earth metal salt, can be precipitated and recovered by adjusting the reaction mixture at a pH of less than 5, preferably of 1–2, with a mineral acid such as hydrochloric acid, sulfuric acid or the like.

The Compound I thus obtained is characterized by a sufficiently high purity, and so it is possible to use it as the starting material for the production of GSH, without any further purification. However, it can be recrystallized in a conventional manner to give the compound of a higher purity, if so desired.

As the protecting group $R^1$ for the amino group in Compounds II used as the starting material of the process of this invention, there can be mentioned for example benzyloxycarbonyl group, p-toluenesulfonyl group, formyl group or the like. As the group $R^2$, there can be mentioned a hydrogen atom, methyl group, ethyl group or the like. The starting material does not necessarily have to be in very pure form. A small amount of an organic solvent immiscible with water, such as methylene chloride, chloroform or the like, which may result from the procedure for the synthesis of the Compound II and may contaminate the same, does not affect the hydrolysis reaction.

The present invention is further illustrated by the following examples. These examples, however, do not impose any restriction on the scope of the invention:

EXAMPLE 1

To 5.71 g. of ethyl (3-benzyloxycarbonyl-5-oxo-4-oxazolidinyl)propionyl-S-benzyl - L - cysteinylglycinate are added 22 ml. of 1 N aqueous sodium hydroxide solution, and the mixture is stirred for one hour at room temperature. The solution so obtained is then adjusted to pH 1 with hydrochloric acid whereby crystals precipitate. The crystals are collected by filtration, washed with water and dried in a desiccator with calcium chloride to give 5.2 g. of N-benzyloxycarbonyl-γ-L-glutamyl-S-benzyl-L-cysteinylglycine. Yield: 98%.

To a part of the product a small amount of 27% hydrogen bromide in glacial acetic acid is added under substantially anhydrous conditions, and the reaction mixture is shaken for about 10 minutes. After the addition of dry ether, a white precipitate is formed. The crystals are collected by centrifugation and filtration, and then dried in a desiccator with phosphorus pentoxide.

In a high voltage paper-electrophoresis of the crystals thus obtained, using a voltage of 4 kv., a strip of Toyo filter paper No. 51 60 cm. x 8 cm. in size and a mixture of pyridine/acetic acid/water (volume ratio 1:10:89) as buffer, only the spot of S-benzyl-glutathione is found after one hour at a position far from the original point i.e., 5–6 cm. closer to the anode and any spot of S-benzyl-isoglutathione can not be observed at the position far from the original point 4–5 cm. closer to the cathode.

EXAMPLE 2

To 5.92 g. of ethyl(3-p-toluenesulfonyl-5-oxo-4-oxazolidinyl)propionyl-S-benzyl-L-cysteinylglycinate are added 22 ml. on 1 N aqueous sodium hydroxide solution, and the mixture is stirred for one hour at room temperature. The solution thus obtained is then adjusted to pH 2 with hydrochloric acid whereby a glutinous matter precipitates. The glutinous matter is collected by filtration, washed with water and dried in a desiccator with phosphorus pentoxide to give 5.6 g. of N-p-toluene-sulfonyl-γ-L-glutamyl-S-benzyl-L-cysteinylglycine. Yield: 98.5%.

EXAMPLE 3

To 4.5 g. of methyl (3-formyl-5-oxo-4-oxazolidinyl) propionyl-S-benzyl-L-cysteinylglycinate are added 22 ml. of 1 N aqueous potassium hydroxide solution, and the mixture is stirred for two hours at room temperature. The resulting solution is then adjusted to pH 1 with hydrochloric acid whereby crystals precipitate. The crystals are collected by filtration, washed with water and dried in a desiccator with calcium chloride to give 4.3 g. of N-formyl-γ-L-glutamyl-S-benzyl-L-cysteinylglycine. Yield: 97.8%.

What is claimed is:

1. In an improved process for the preparation of N-protected-γ-L-glutamyl-S-benzyl - L - cysteinylglycines of the Formula I

wherein $R^1$ is a member of the group consisting of benzyloxycarbonyl, p-toluene sulfonyl and formyl groups by hydrolysis of a compound of the Formula II

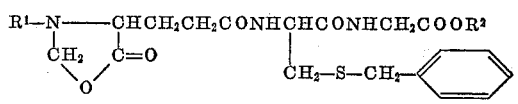

wherein $R^1$ is as defined above and $R^2$ is hydrogen or a lower alkyl group, in an alkaline medium, the improvement comprising conducting the hydrolysis, at about room temperature, in the presence of at least an equimolar amount of an aqueous alkali metal solution in a concentration of about 1 normal, in the absence of any organic solvent.

2. A process according to claim 1 wherein $R^1$ is a benzyloxycarbonyl group or a p-toluenesulfonyl group and $R^2$ is a lower alkyl group.

3. A process according to claim 1 wherein $R^2$ is an ethyl group and the aqueous alkali metal solution is sodium hydroxide.

4. A process according to claim 1 wherein $R^1$ is a formyl group, $R^2$ is a methyl group and the alkali metal solution is potassium hydroxide.

References Cited

Micheel et al.: Chem. Abst. 57, 3558b (1962).
Helge: ibid, 68, 39523b (1968).
Adams et al.: ibid, 16, 4211 (1922).
Baudet: Ann. Chem. (Rome), 53, 53–60 (1963).

LORRAINE A. WEINBERGER, Primary Examiner

J. F. TERAPANE, Assistant Examiner